US010075884B2

(12) United States Patent
Kampmann et al.

(10) Patent No.: US 10,075,884 B2
(45) Date of Patent: *Sep. 11, 2018

(54) ASSIGNMENT AND HANDOVER IN A RADIO COMMUNICATION NETWORK (71) Applicant: Telefonaktiebolaget LM Ericsson (publ), Stockholm (SE)

(72) Inventors: Dirk Kampmann, Vaals (NL); Karl Hellwig, Wonfurt (DE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/223,011

(22) Filed: Jul. 29, 2016

(65) Prior Publication Data

US 2016/0337913 A1 Nov. 17, 2016

Related U.S. Application Data (63) Continuation of application No. 12/809,477, filed as application No. PCT/IB2008/003566 on Dec. 19, 2008, now Pat. No. 9,439,109.

(Continued)

(51) Int. Cl.
*H04W 4/00* (2018.01)
*H04W 36/00* (2009.01)
(Continued)

(52) U.S. Cl.
CPC ... *H04W 36/0072* (2013.01); *H04W 72/0433* (2013.01); *H04W 72/0446* (2013.01);
(Continued)

(58) Field of Classification Search
CPC ......... H04W 36/0072; H04W 72/0446; H04W 72/0433; H04W 72/0413; H04W 72/042; H04W 92/14; H04W 76/041
See application file for complete search history.

(56) References Cited

U.S. PATENT DOCUMENTS 9,439,109 B2 * 9/2016 Kampmann ...... H04W 36/0072
2004/0240381 A1 12/2004 Clark et al.
(Continued)

FOREIGN PATENT DOCUMENTS

EP 1868395 A1 12/2007

OTHER PUBLICATIONS

3rd Generation Partnership Project. 3GPP TR 43.903, V0.0.2 (Nov. 2007). 3rd Generation Partnership Project; Technical Specification Group GERAN; A-interface over IP Study (AINTIP); (Release 8). Nov. 2007.1.

(Continued)

*Primary Examiner* — Ayaz Sheikh
*Assistant Examiner* — Hai-Chang Hsiung
(74) *Attorney, Agent, or Firm* — Coats & Bennett, PLLC (57) ABSTRACT Systems and methods related to performing an assignment and a handover in a radio communication network are provided. In one exemplary embodiment, a method performed by a Mobile Switching Center (MSC) of a radio communication network may include seizing resources for a Time Division Multiplexed (TDM) bearer and an Internet Protocol (IP) bearer for use on a terrestrial A-interface of the radio communication network for an activity to be performed by a target Base Station Controller (BSC) of the radio communication network. Further, the method may include sending, to the target BSC, an indication that requests the activity be performed by the target BSC and that also identifies the seized resources for the TDM bearer and the IP bearer for use on the terrestrial A-interface for the activity 24 Claims, 7 Drawing Sheets

Related U.S. Application Data (60) Provisional application No. 61/015,294, filed on Dec. 20, 2007.

(51) Int. Cl.
 *H04W 72/04* (2009.01)
 *H04W 92/14* (2009.01)
 *H04W 76/22* (2018.01)

(52) U.S. Cl.
 CPC ...... *H04W 72/042* (2013.01); *H04W 72/0413* (2013.01); *H04W 76/22* (2018.02); *H04W 92/14* (2013.01)

(56) References Cited

U.S. PATENT DOCUMENTS

| | | |
|---|---|---|
| 2006/0079258 A1 | 4/2006 | Gallagher et al. |
| 2006/0245368 A1 | 11/2006 | Ladden et al. |
| 2007/0275724 A1* | 11/2007 | Kikuchi .............. H04W 92/12 455/436 |
| 2008/0019293 A1* | 1/2008 | Chang ................. H04W 88/16 370/310 |
| 2008/0076432 A1 | 3/2008 | Senarath et al. |
| 2009/0061873 A1 | 3/2009 | Bao et al. |
| 2011/0149838 A1 | 6/2011 | Gallagher et al. |

OTHER PUBLICATIONS

3rd Generation Partnership Project. "AoIP Call Control Signalling." 3GPP TSG GERAN2 Meeting #35bis, Tdoc G2-070333, Sophia Antipolis, France, Oct. 8-12, 2007.

3rd Generation Partnership Project. "Open Issues in the A over IP TR." 3GPP TSG-GERAN #37, Tdoc GP-080257, Agenda Item: 7.2.5.3.5, Seoul, Korea, Feb. 18-22, 2008.

Alcatel-Lucent, "Reduction of the speech interruption time during internal BSS handover with AoIP," 3GPP TSG GERAN Meeting No. 36, Nov. 12-16, 2007, GP-071809, Vancouver, Canada.

* cited by examiner

ASSIGNMENT AND HANDOVER IN A RADIO COMMUNICATION NETWORK

CROSS-REFERENCE TO RELATED APPLICATIONS

This application is a continuation of U.S. patent application Ser. No. 12/809,477, filed Oct. 11, 2010, which is the National Stage of International Application No. PCT/IB2008/003566, filed Dec. 19, 2008, which claims priority to U.S. Provisional Patent Application No. 61/015,294, filed Dec. 20, 2007, all of which are hereby incorporated by reference as if fully set forth herein.

TECHNICAL FIELD

The present invention is related to assignment and handover in a radio communication network. (As used herein, references to the "present invention" or "invention" relate to exemplary embodiments and not necessarily to every embodiment encompassed by the appended claims.) More specifically, the present invention is related to assignment and handover in a radio communication network where a first resource indicator and a second resource indicator are offered together in a message for selection.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The A-interface is defined in 3GPP as the terrestrial interface between the MSC node and the BSS radio network. Today TDM is the only defined bearer technology for user plane connection defined in the A-interface. The A-interface is defined in 3GPP technical specification 48.001 (3GPP TS 48.001 Base Station System—Mobile-services Switching Centre (BSS-MSC) interface; General aspects) and the references specified therein.

Handover procedures are defined in 3GPP technical specification 23.009 (3GPP TS 23.009 Handover Procedures). The technical specification assumes an A-interface as defined in the 3GPP standard (3GPP TS 48.001 Base Station System—Mobile-services Switching Centre (BSS-MSC) interface; General aspects).

Figure 1:
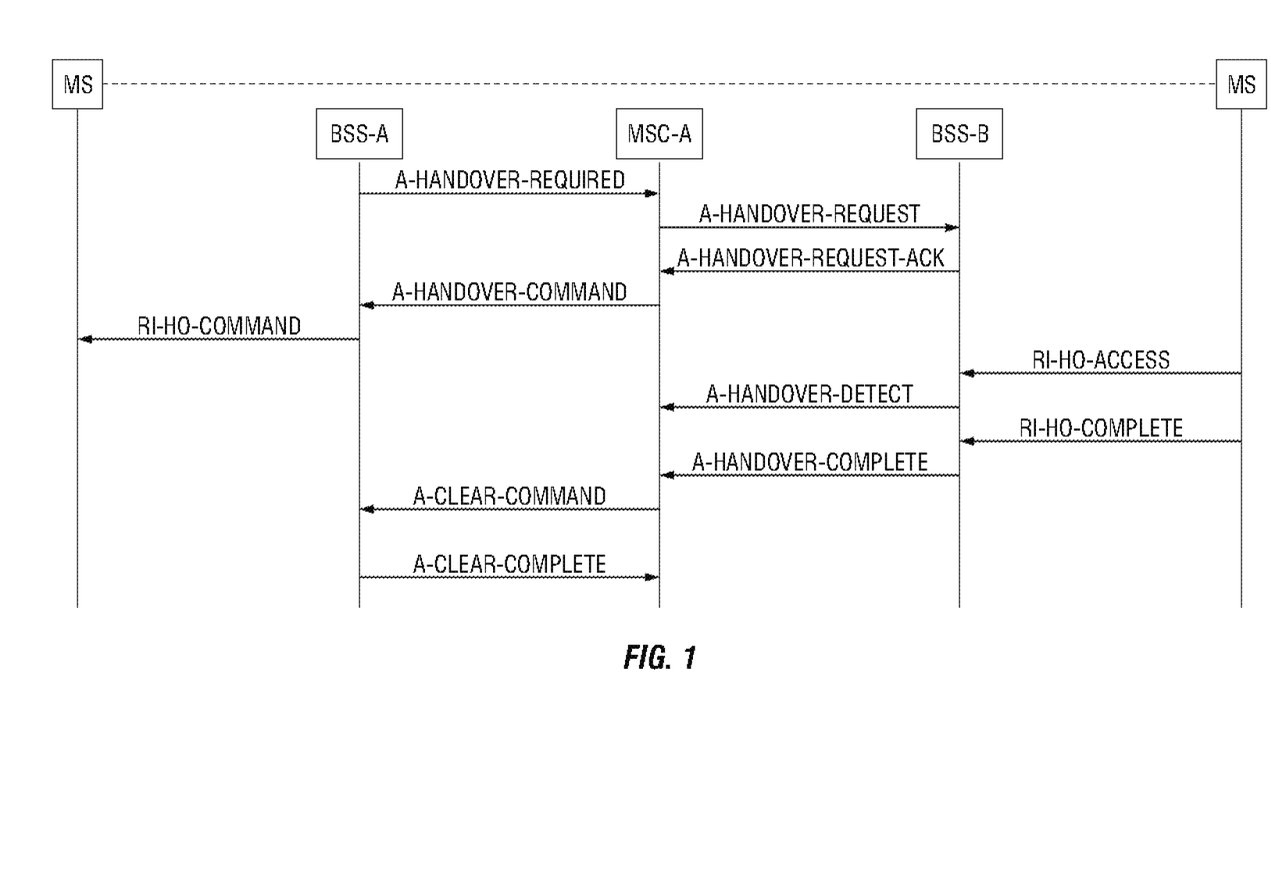
FIG. 1 shows an intra MSC, inter BSC, GSM to GSM handover procedure.

FIG. 1 shows the procedure for an intra MSC, inter BSC, GSM to GSM handover procedure taken from 3GPP TS 23.009 Handover Procedures. This procedure is chosen as an example because it is used below to describe the concept of the new invention.

In regard to problems with existing solutions, currently the effort is taken to enhance the current standardized A-interface and to support the A-interface as well for IP used as bearer for the user plane. Although in the further disclosed, reference is made to IP technology as a further supported technology, the invention is not limited thereto but encompasses any differing bearer technology. It is assumed that during a network migration from the currently standardized A-interface (AoTDM) to the enhanced A-interface (AoIP) the two bearer technologies defined for the user plane are used in parallel. This may not be needed in all migration scenarios but it is seen as a likely scenario for many operators.

Applying the current 3GPP handover procedure (3GPP TS 23.009 Handover Procedures) in such a scenario—parallel use of TDM and IP as user plane bearer—results in the following issue: When the MSC request channel assignment from the target BSC then the MSC does not know if this BSC can establish the terrestrial interface using IP as bearer type. The BSC has the final decision on the bearer type because of the following rules:

In the BSC the decision for a specific bearer on the terrestrial interface may depend on the selected speech coder version for the A-interface.

The BSC has always the final decision regarding the radio codec and the same codec should be used on the terrestrial interface as on the radio link to avoid additional transcoding.

The MSC has to seize bearer resources for the A-interface user plane (terrestrial interface) before it sends BSSMAP Handover Request message to the target BSC. If the target BSC cannot support TDM bearer for the terrestrial interface then BSC has to reject the call. MSC could repeat the BSSMAP Handover Request message using in the new request IP bearer for the terrestrial interface. This handling would require additional signaling on the A-interface and would extend the handover time.

One simple solution to avoid the repetition of the handover request message would be to provide some configuration in MSC about the BSC capability. However, this solution has the following disadvantages:

It is static and cannot provide BSC capability for a specific call

It is error-prone due to manual interaction

Another sub-optimal solution would be that the BSC always accepts the bearer type offered from MSC in the handover request. If it cannot use the codec selected on the radio link on the terrestrial interface, then BSC should use another offered codec type. This solution has the following disadvantages:

The operator has to provide transcoder resources in the BSC to cover the described scenario Inserting a transcoder in the BSC and using compressed speech codec on the terrestrial interface reduces speech quality and increases the delay in the speech path

BRIEF SUMMARY OF THE INVENTION

The present invention pertains to a method for using a network entity of a radio communication network. The method comprises the steps of seizing a first resource and a second resource for a terrestrial interface of the network, where the first resource is distinct and different from the second resource. There is the step of sending a handover request message identifying the first resource and the second resource.

The present invention pertains to a network entity for a radio communication network. The entity comprises a processing unit which causes a first resource and a second resource for a terrestrial interface of the radio network to be seized, where the first resource is distinct and different from the second resource. The entity comprises a network interface through which a handover request message identifying the first and the second resource is sent.

The present invention pertains to a method for using a network entity of a radio communication network. The method comprises the steps of seizing a first resource and a second resource for a terrestrial interface of the network, where the first resource is distinct and different from the second resource. There is the step of sending an assignment request message identifying the first resource and the second resource.

The present invention pertains to a network entity for a radio communication network. The entity comprises a processing unit which causes a first resource and a second resource for a terrestrial interface of the radio network to be seized, where the first resource is distinct and different from the second resource. The entity comprises a network interface through which an assignment request message identifying the first and the second resource is sent.

The present invention pertains to a network entity for a radio communication network. The entity comprises a network interface which receives a handover request message identifying a first resource and a second resource, the first resource distinct and different from the second resource. The entity comprises a processing unit that selects one of the first and second resources, allocates a radio channel associated with the handover, selects a bearer for a terrestrial interface and seizes resources for the interface.

The present invention pertains to a method for a network entity of a radio communication network. The method comprises the steps of receiving a handover request message identifying a first resource and a second resource, the first resource distinct and different from the second resource. There is the step of selecting one of the first and second resources. There is the step of allocating a radio channel associated with the handover. There is the step of selecting a bearer for a terrestrial interface. There is the step of seizing resources for the interface.

The present invention pertains to a network entity for a radio communication network. The entity comprises a network interface which receives an assignment request message identifying a first resource and a second resource, the first resource distinct and different from the second resource. The entity comprises a processing unit that selects one of the first and second resources, allocates a radio channel associated with the assignment, selects a bearer for a terrestrial interface and seizes resources for the interface.

The present invention pertains to a method for a network entity of a radio communication network. Any method comprises the steps of receiving an assignment request message identifying a first resource and a second resource, the first resource distinct and different from the second resource. There is the step of selecting one of the first and second resources. There is the step of allocating a radio channel associated with the assignment. There is the step of selecting a bearer for a terrestrial interface. There is the step of seizing resources for the interface.

BRIEF DESCRIPTION OF THE DRAWINGS

In the accompanying drawings, the preferred embodiment of the invention and preferred methods of practicing the invention are illustrated in which.

DETAILED DESCRIPTION

Figure 2:
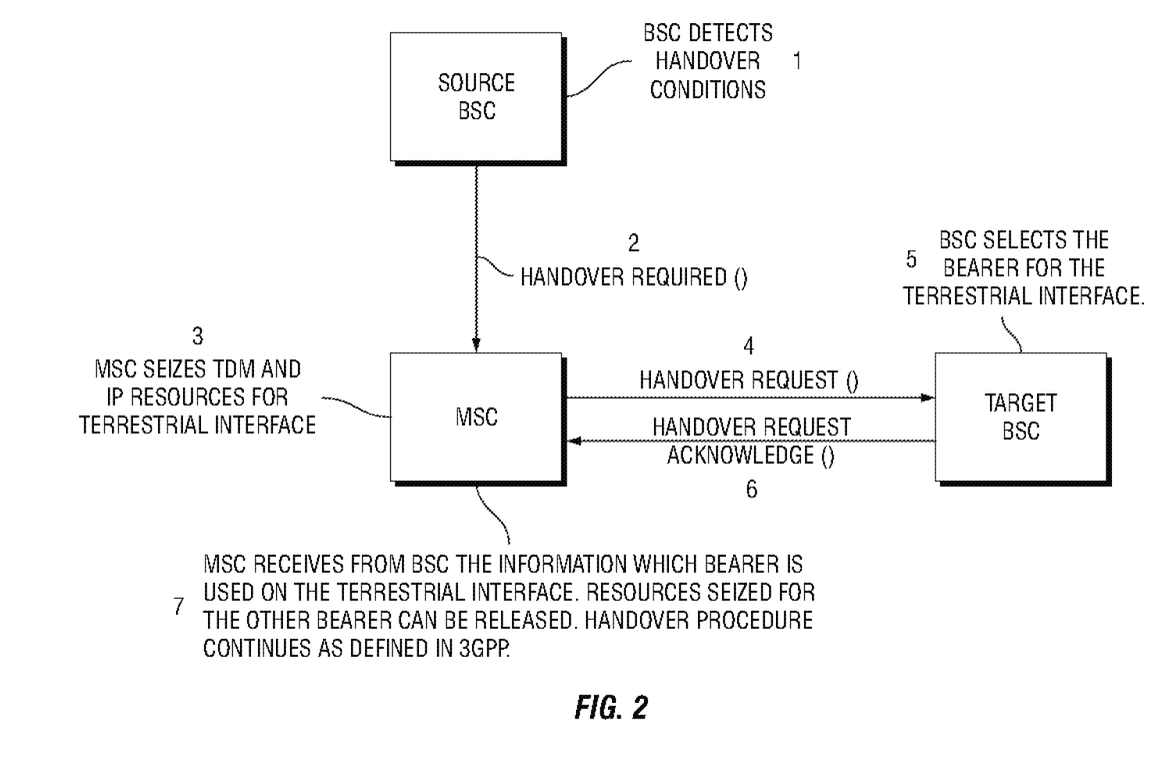
FIG. 2 shows inter BSC handover using AoTDM and AoIP of the present invention.
Figure 7:
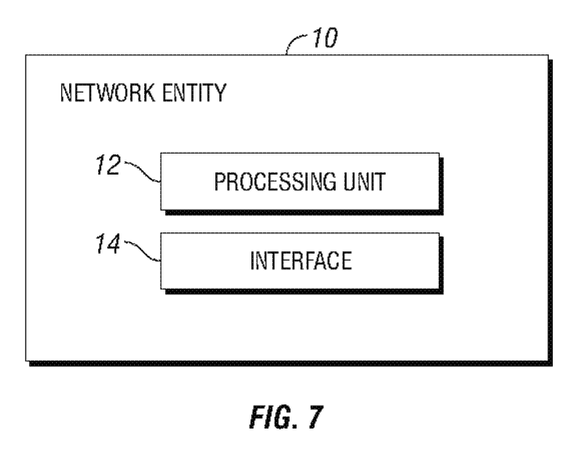
FIG. 7 is a block diagram of a network entity of the present invention.

Referring now to the drawings wherein like reference numerals refer to similar or identical parts throughout the several views, and more specifically to FIGS. 2 and 7 thereof, there is shown a network entity 10, such as an MSC, for a radio communication network. The entity comprises a processing unit 12 which causes a first resource and a second resource for a terrestrial interface of the radio network to be seized, where the first resource is distinct and different from the second resource. The entity comprises a network interface 14 through which a handover request message identifying the first and the second resource is sent.

Preferably, the network interface 14 receives an acknowledgment of the handover. The processing unit 12 preferably detects that one of the first and second resources is selected for a bearer. Preferably, the processing unit 12 causes an unselected one of the first and second resources to be released.

The network interface 14 preferably sends the handover request message with a circuit identifier code of a selected time division multiplexing (TDM) circuit with respect to a TDM bearer, and with a transport address of a media gateway (MGw) that will terminate an IP connection with respect to an IP bearer.

The present invention pertains to a method for using a network entity 10, such as an MSC, of a radio communication network. The method comprises the steps of seizing a first resource and a second resource for a terrestrial interface of the network, where the first resource is distinct and different from the second resource. There is the step of sending a handover request message identifying the first resource and the second resource.

Preferably, there is the step of receiving an acknowledgment of the handover. There is preferably the step of detecting that one of the first and second resources is selected for a bearer. Preferably, there is the step of releasing an unselected one of the first and second resources.

The sending step preferably includes the step of sending the handover request message with a circuit identifier code of a selected time division multiplexing (TDM) circuit with respect to a TDM bearer, and with a transport address of a media gateway (MGw) that will terminate an internet protocol (IP) connection with respect to an IP bearer. The transport address can include an IP address and a port number.

The present invention pertains to a method for using a network entity 10, such as an MSC, of a radio communication network. The method comprises the steps of seizing a first resource and a second resource for a terrestrial interface of the network, where the first resource is distinct and different from the second resource. There is the step of sending an assignment request message identifying the first resource and the second resource.

Preferably, there is the step of receiving an assignment complete message that indicates a bearer shall be used on an A-interface user plane connection.

The present invention pertains to a network entity 10 for a radio communication network. The entity comprises a processing unit 12 which causes a first resource and a second resource for a terrestrial interface of the radio network to be seized, where the first resource is distinct and different from the second resource. The entity comprises a network interface 14 through which an assignment request message identifying the first and the second resource is sent.

The present invention pertains to a network entity 10, such as a BSC, for a radio communication network. The entity comprises a network interface 14 which receives a handover request message identifying a first resource and a second resource, the first resource distinct and different from the second resource. The entity comprises a processing unit 12 that selects one of the first and second resources, allocates a radio channel associated with the handover, selects a bearer for a terrestrial interface and seizes resources for the interface.

Preferably, the network interface 14 sends an acknowledgment of the handover request. The acknowledgment request preferably includes information that identifies which bearer is used on the terrestrial interface.

Preferably, the handover request message is a BSSMAP handover request with a circuit identifier code of a selected time division multiplexing (TDM) circuit with respect to a TDM bearer, and with a transport address of a media gateway (MGw) that will terminate an IP connection with respect to an IP bearer.

The present invention pertains to a method for a network entity 10, such as a BSC, of a radio communication network. The method comprises the steps of receiving a handover request message identifying a first resource and a second resource, the first resource distinct and different from the second resource. There is the step of selecting one of the first and second resources. There is the step of allocating a radio channel associated with the handover. There is the step of selecting a bearer for a terrestrial interface. There is the step of seizing resources for the interface.

Preferably, there is the step of sending an acknowledgment of the handover request. The acknowledgment preferably includes information that identifies which bearer is used on the terrestrial interface.

Preferably, the receiving step includes the step of receiving a BSSMAP handover request with a circuit identifier code of a selected time division multiplexing (TDM) circuit with respect to a TDM bearer, and with a transport address of a media gateway (MGw) that will terminate an IP connection with respect to an IP bearer.

The present invention pertains to a network entity 10, such as a BSC, for a radio communication network. The entity comprises a network interface 14 which receives an assignment request message identifying a first resource and a second resource, the first resource distinct and different from the second resource. The entity comprises a processing unit 12 that selects one of the first and second resources, allocates a radio channel associated with the assignment, selects a bearer for a terrestrial interface and seizes resources for the interface.

The present invention pertains to a method for a network entity 10, such as a BSC, of a radio communication network. The method comprises the steps of receiving an assignment request message identifying a first resource and a second resource, the first resource distinct and different from the second resource. There is the step of selecting one of the first and second resources. There is the step of allocating a radio channel associated with the assignment. There is the step of selecting a bearer for a terrestrial interface. There is the step of seizing resources for the interface.

There is preferably the step of selecting the bearer to be used on an A-interface user plane connection. Preferably, there is the step of sending an assignment complete message indicating the selected bearer.

Although this invention is explained with reference to 3GPP herein, the invention is not limited to 3GPP compliant networks but may encompass also other networks like the (W)iDEN compatible networks.

In the operation of the invention, to improve the inter BSC handover procedure for intra MSC or inter MSC handover scenarios, the handover can be either GSM to GSM handover or WCDMA to GSM handover or any other HO from any radio technology to GSM such as LTE to GSM.

MSC automatically detects if BSC can support IP on the terrestrial interface. Therefore, MSC monitors mobile originating and mobile terminating calls. As soon as BSC uses AoIP for any of those calls MSC marks the BSC as capable to support IP bearer. The call set-up procedure for AoIP supports that MSC and BSC are negotiating which bearer to use.

MSC seizes resources for the TDM bearer and the IP bearer before the handover request message is sent to BSC. Then BSC can choose any of the bearer types. In the BSSMAP Handover Request Acknowledge message the BSC informs the MSC about the selected bearer type. Finally MSC can release the seized resources from the not selected bearer type.

FIG. 2 shows the concept of the improved handover procedure. The numbers in the figure indicate the sequence of actions.

In a first step 1, a BSC (source BSC) detects a handover condition and indicates in a second step 2 towards a MSC that a Handover is required. In a next step 3, the MSC seizes TDM resources and resources for other bearer(s), e.g. IP for the terrestrial interface. Thereafter, in step 4, a handover request is sent towards a further BSC (target BSC) including an indication about the seized resources. The further BSC (target BSC) selects a bearer for the terrestrial interface and sends an acknowledgement of said handover request in a further step 6 towards the MSC. Either within the acknowledgement or within any other appropriate message information which bearer is used on the terrestrial interface is provided towards the MSC. Finally, the MSC uses the provided information which bearer is used on the terrestrial interface in a step 7 to continue handover procedure, e.g. as defined in 3GPP. In addition, the MSC may also use provided information which bearer is used on the terrestrial interface to release the unused but seized resources for the other bearers.

The improvement for the inter BSC handover procedure is based on the following scenario:
Target BSC can support AoTDM and AoIP
Note: the MSC sending the handover request to the target MSC does not know in advance, which bearer BSC will select.
GSM to GSM or WCDMA to GSM handover is performed MSC monitors the call set-up procedures for mobile originating and mobile terminating calls. Once BSC uses AoIP for any of those calls the MSC marks that BSC is capable using IP on the user plane.

The information whether a BSC supports AoIP may also be provided towards the MSC in a different manner, e.g. it might be administered via an O&M (Operations & Maintenance) tool.

During handover procedure, one MSC sends the BSSMAP Handover Request to the target BSC. This can be either the anchor MSC (intra MSC HO procedure or subsequent inter MSC HO back to anchor MSC), or in the non-anchor MSC (intra MSC in non-anchor MSC, inter MSC handover or sub-sequent inter MSC handover to another non-anchor MSC).

Figure 3:
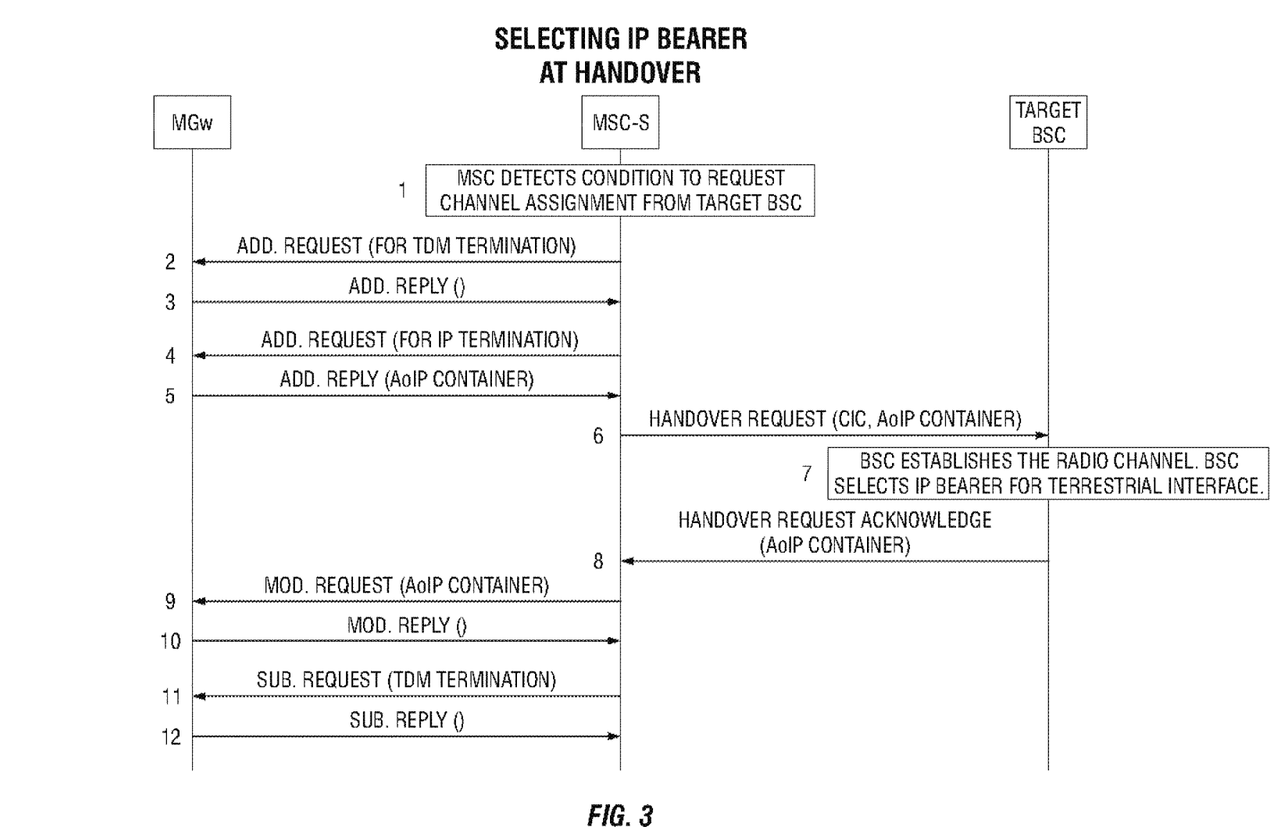
FIG. 3 shows improved inter BSC HO; BSC selects IP bearer for the terrestrial interface of the present invention.

FIG. 3 shows a possible message flow that can be used for the proposed handover procedure. In this example the BSC selects IP bearer for the terrestrial interface.

The following steps are shown in FIG. 3:

First the MSC detects a condition to request channel assignment from source BSC (step 1). This could be for example the reception of BSSMAP Handover Required message from BSC (intra MSC HO) or the reception of MAP Prepare Handover Request message (inter MSC HO).

Then MSC seizes a TDM circuit and IP resources for the terrestrial interface towards the target BSC. This involves MSC internal processes and in case of layered network architecture the MSC-S has to request MGw to seize a TDM termination and an IP termination (steps 2-5).

Then MSC sends the BSSMAP Handover Request message to the target BSC (step 6). This message includes the circuit identify code (CIC)—in case MSC allocates the CIC - and a container (AoIP Container) used to transport IP address information from the MGW to the BSC.

BSC allocates the radio channel, selects the bearer for the terrestrial interface and seizes resources for this interface (step 7). Here, the BSC decides to use IP bearer.

In the acknowledgment message the BSC provides its user plane address information within the AoIP Container (step 8). MSC identifies that IP is selected for the bearer because it receives the AoIP Container.

MSC is passing the contents of the AoIP Container to the MGW (steps 9, 10).

MSC releases the seized TDM resources. In layered architecture MSC request MGW to release the TDM termination (steps 11, 12).

Figure 5:
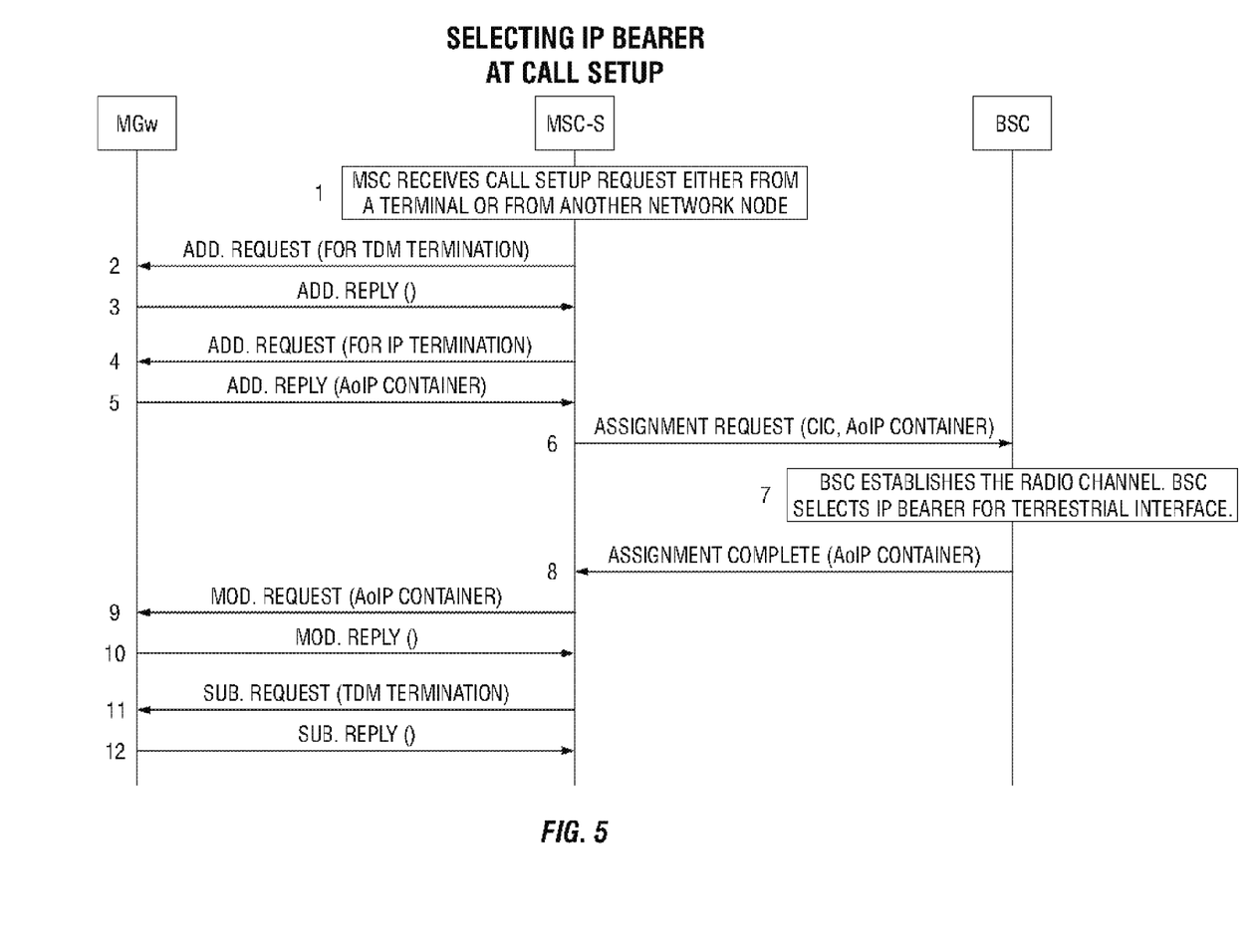
FIG. 5 shows the selection of the IP bearer at call setup of the present invention.

FIG. 5 shows the selection of the IP bearer at call setup (assignment).

Figure 4:
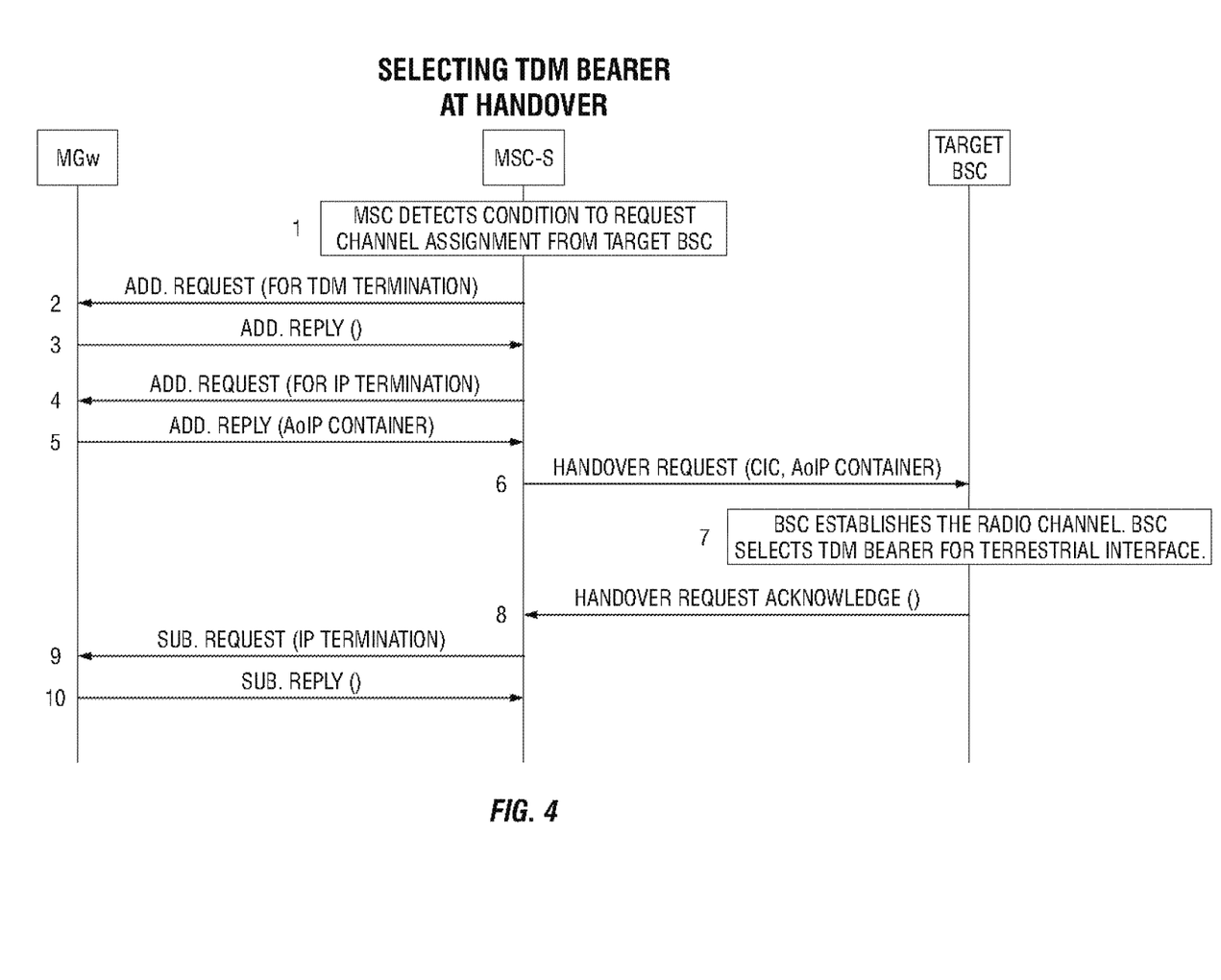
FIG. 4 shows improved inter BSC HO; BSC selects TDM bearer for the terrestrial interface of the present invention.

FIG. 4 shows a second example for a possible message flow that can be used for the proposed handover procedure. In this example the BSC selects TDM as bearer for the terrestrial interface.

The steps 1-6 are equal to the case before, where BSC selected IP bearer for the terrestrial interface. The following steps are different:

BSC allocates the radio channel, selects the bearer for the terrestrial interface and seizes resources for this interface (step 7). In opposite to the previous example, here, the BSC decides to use TDM bearer.

BSC sends the acknowledgement message as defined in 3GPP for AoTDM (step 8). MSC identifies that TDM is selected for the bearer because it does not receive the AoIP Container.

MSC releases the seized IP resources. In layered architecture MSC request MGW to release the IP termination (steps 9, 10).

Note, that in case BSC is responsible to allocate the CIC the following changes have to be applied to the examples above:

MSC does not provide a CIC in the Handover Request message (both examples).

If BSC select TDM bearer for the terrestrial interface it provides a CIC in the Handover Request Acknowledge message (first example).

Figure 6:
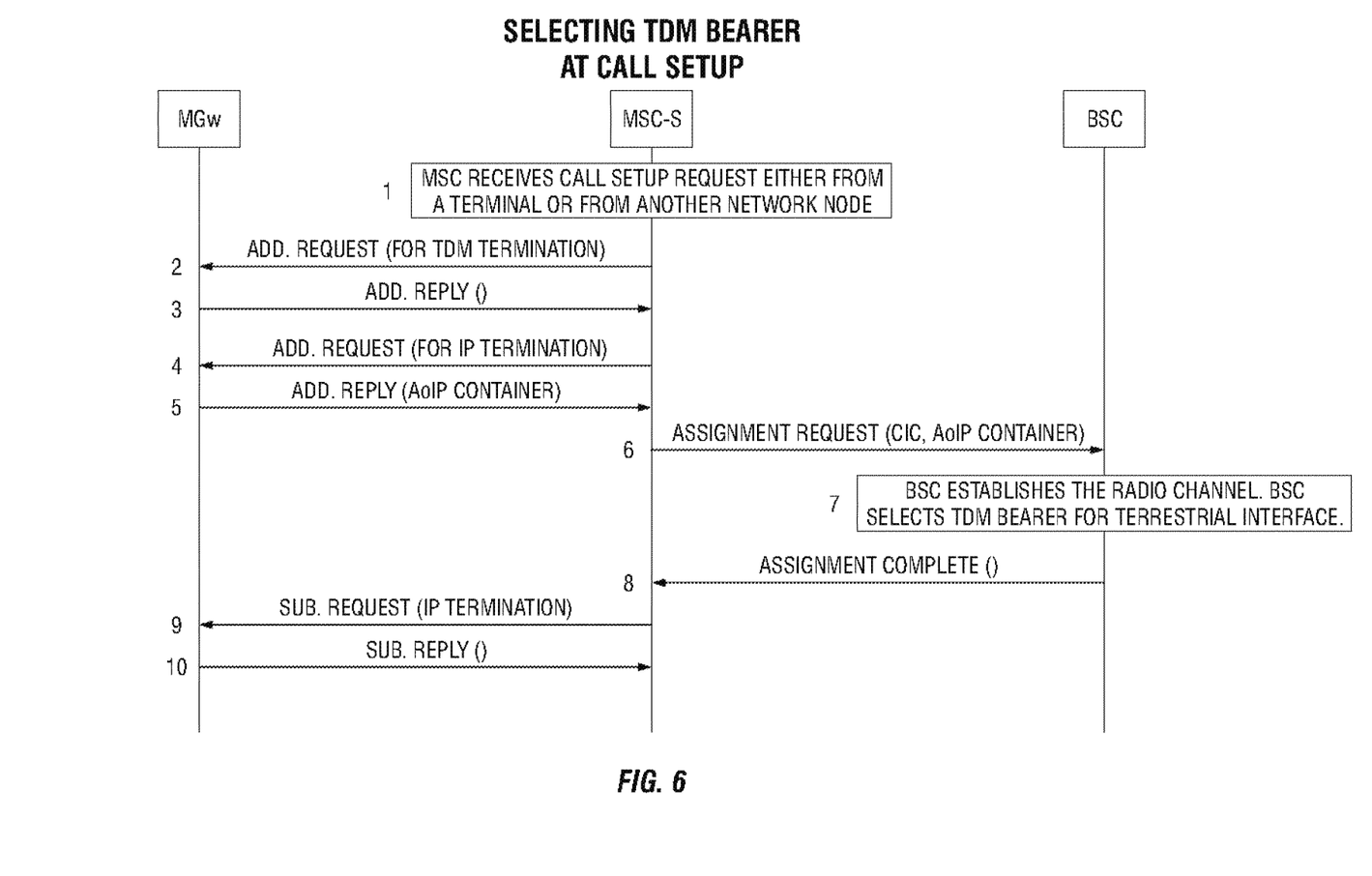
FIG. 6 shows the selection of the TDM bearer at call setup of the present invention.

FIG. 6 shows the selection of the TDM bearer at call setup (assignment).

Handover (HO) and assignment request are two independent functions. Assignment request is at call setup. It is mandatory to establish the radio connection (mobile terminal to antenna and further to the BSC node) and to connect that part with the core network.

Handover is a process that is performed during the call when the terminal is moving around. Different handover types can be distinguished: while moving the terminal may reach the area of a new antenna, a new radio coverage cell, an area that is controlled by another BSC or even an area that is controlled by another MSC. Further intersystem handover is possible, that means a calling subscriber starts a call in the 2G network and changes to the 3G network.

With respect to the invention herein, the relevant handover process is the inter BSC intra MSC (the BSC is changed, and both BSC nodes are controlled by the one MSC).

Not shown (but still possible) is inter BSC inter MSC HO. In this case BSC and MSC are changed. Not shown but still possible is the inter system handover where the target system is a GSM system. The source system can be any technology for example WCDMA or LTE.

With reference to FIGS. 5 and 6, the following are the steps for Assignment.

1. MSC detects a condition to perform call setup.
2. MSC seizes a TDM termination to be used in case BSC selects the TDM bearer for the A-interface user plane connection later. In the ADD Request MSC specifies the TDM termination identifier to be seized (not shown). The TDM termination identifier can be mapped uniquely to the CIC used in this call.
3. MGw replies on the ADD Request.
4. MSC seizes an IP termination to be used in case BSC selects the IP bearer for the A-interface user plane connection later.
5. MGw replies on the ADD Request.
6. MSC sends BSSMAP Assignment Request message to trigger the channel assignment in the target BSC. MSC provides the CIC and the AoIP Container, where one of them is to be used for the call.
7. BSC establishes the radio channel. Further BSC selects the bearer to be used on the A-interface user plane connection. In this example (FIG. 5) BSC decided to use the TDM bearer.
8. BSC sends Assignment Complete message back to MSC as specified in standard.
9. From the received Assignment Complete message MSC deducts that TDM bearer (see FIG. 6). shall be used on A-interface user plane connection. MSC requests MGw to remove the previously seized IP termination.
10. MGw confirms the SUB Request.

The present invention includes, but is not limited to, the following inventive steps:

MSC detects BSS capability to support IP on the terrestrial interface

MSC seizes a TDM and IP bearer before it request channel assignment from the target BSC MSC releases unused resources after BSC selected a bearer and informed MSC about the decision The invention has the following advantages:

MSC automatically detects if BSC is capable to support IP bearer for the terrestrial interface The BSSMAP message defined for the 3GPP handover procedure and assignment procedure can be reused.

BSC has full freedom to select the bearer for the terrestrial interface.

No configuration in MSC or BSC is required

The procedure is only applicable for the case that AoIP and AoTDM are used in parallel.

The procedure can be removed and does not have any additional impact in case BSC supports on AoIP (proposed target solution for future networks).

The procedure supports CIC selection in MSC and CIC selection in BSC (for AoTDM)

Abbreviations:
(W)iDEN (Wideband) Integrated Digital Enhanced Network
3GPP 3$^{rd}$ generation Partnership Project
AoIP A-Interface (user plane) over IP
AoTDM A-Interface (user plane) over TDM
BSC Base Station Controller
BSS Base Station Subsystem
BSSMAP Base Station System Management Application Part
CIC Circuit Identity Code
GSM Global System for Mobile communications
HO Handover
iDEN Integrated Digital Enhanced Network
IP Internet Protocol
LTE Long Term Evolution
MGw Media Gateway
MSC Mobile Switching Center
MSC-S Mobile Switching Center Server
TDM Time-division Multiplexing
WCDMA Wideband Code Division Multiple Access Although the invention has been described in detail in the foregoing embodiments for the purpose of illustration, it is to be understood that such detail is solely for that purpose and that variations can be made therein by those skilled in the art without departing from the scope of the invention except as it may be described by the following claims.

The invention claimed is:

1. A method performed by a Mobile Switching Center (MSC) of a radio communication network, comprising:
   seizing resources for a Time Division Multiplexed (TDM) bearer and an Internet Protocol (IP) bearer for use on a terrestrial A-interface of the radio communication network for an activity to be performed by a target Base Station Controller (BSC) of the radio communication network;
   sending, to the target BSC, an indication that requests the activity be performed by the target BSC and that also identifies the seized resources for the TDM bearer and the IP bearer for use on the terrestrial A-interface for the activity;
   receiving, from the target BSC, an indication that acknowledges the target BSC receiving the activity request; and
   determining that one of the TDM bearer and the IP bearer is selected based on the acknowledgement.

2. The method of claim 1, wherein the acknowledgement indicates which bearer is selected for use on the terrestrial A-interface.

3. The method of claim 1, further comprising:
   releasing an unselected one of the TDM bearer and the IP bearer for use on the terrestrial A-interface responsive to said determining.

4. The method of claim 1, further comprising:
   receiving, from a source BSC of the radio communication network, an indication that the activity is required; and
   wherein said seizing and said sending is responsive to receiving the activity required indication.

5. The method of claim 1, wherein the activity is one of a handover and an assignment.

6. The method of claim 1, wherein the request indication includes a circuit identifier code (CIC) of a selected TDM circuit with respect to the TDM bearer.

7. The method of claim 1, wherein the request indication includes a transport address of a media gateway (MGw) that will terminate an IP connection with respect to the IP bearer.

8. The method of claim 1, wherein said seizing comprises:
   sending, to a media gateway (MGw), a request indication to seize resources for the TDM and IP bearers for use on the terrestrial A-interface for the activity; and
   in response to sending the request indication, receiving, from the MGw, a reply indication that identifies the seized resources for the TDM bearer and the IP bearer for use on the terrestrial A-interface for the activity.

9. A Mobile Switching Center (MSC) for a radio communication network, comprising:
   a processing circuit configured to:
      seize resources for a Time Division Multiplexed (TDM) bearer and an Internet Protocol (IP) bearer for use on a terrestrial A-interface of the radio communication network for an activity to be performed by a target Base Station Controller (BSC) of the radio communication network;
      send, to the target BSC, an indication that requests the activity be performed by the target BSC and that also identifies the seized resources for the TDM bearer and the IP bearer for use on the terrestrial A-interface for the activity;
      receive, from the target BSC, an indication that acknowledges the target BSC receiving the activity request; and
      determine that one of the TDM bearer and the IP bearer is selected based on the acknowledgement.

10. The MSC of claim 9, further comprising:
    a network interface circuit operationally coupled to the processing circuit and through which the request indication is sent.

11. The MSC of claim 9, wherein the acknowledgement indicates which bearer is selected for use on the terrestrial A-interface.

12. The MSC of claim 9, wherein the processing circuit is further configured to:
    release an unselected one of the TDM bearer and the IP bearer for use on the terrestrial A-interface responsive to said determining.

13. The MSC of claim 9, wherein the processing circuit is further configured to:
    receive, from a source BSC of the radio communication network, an indication that the activity is required; and
    wherein said seizing and said sending is responsive to receiving the activity required indication.

14. The MSC of claim 9, wherein the activity is one of a handover and an assignment.

15. The MSC of claim 9, wherein said seizing includes the processing circuit being further configured to:
    send, to a media gateway (MGw), a request indication to seize resources for the TDM and IP bearers for use on the terrestrial A-interface for the activity; and
    in response to sending the request indication, receive, from the MGw, a reply indication that identifies the seized resources for the TDM bearer and the IP bearer for use on the terrestrial A-interface for the activity.

16. A method of operating a Base Station Controller (BSC) of a radio communication network, comprising:
    receiving, from a Mobile Switching Center (MSC) of the radio communication network, an indication that requests an activity be performed by the BSC and that also identifies seized resources for a Time Division Multiplexed (TDM) bearer and an Internet Protocol (IP) bearer for use on a terrestrial A-interface of the radio communication network for the activity;

selecting one of the TDM bearer and the IP bearer for use on the terrestrial A-interface for the activity;

allocating a radio channel of the radio communication network that is associated with the activity; and sending, to the MSC, an indication that acknowledges the BSC receiving the activity request so that the MSC is operable to determine that one of the TDM bearer and the IP bearer is selected based on the acknowledgement.

17. The method of claim 16, wherein the activity is one of a handover and an assignment.

18. The method of claim 16, wherein the request indication includes a circuit identifier code (CIC) of a selected TDM circuit with respect to the TDM bearer.

19. The method of claim 16, wherein the request indication includes a transport address of a media gateway (MGw) that will terminate an IP connection with respect to the IP bearer.

20. A Base Station Controller (BSC) of a radio communication network, comprising:

a processing circuit configured to:
receive, from a Mobile Switching Center (MSC) of the radio communication network, an indication that requests an activity be performed by the BSC and that also identifies seized resources for a Time Division Multiplexed (TDM) bearer and an Internet Protocol (IP) bearer for use on a terrestrial A-interface of the radio communication network for the activity;

select one of the TDM bearer and the IP bearer for use on the terrestrial A-interface for the activity; and allocate a radio channel of the radio communication network that is associated with the activity; and send, to the MSC, an indication that acknowledges the BSC receiving the activity request so that the MSC is operable to determine that one of the TDM bearer and the IP bearer is selected based on the acknowledgement.

21. The BSC of claim 20, further comprising:
a network interface circuit operationally coupled to the processing circuit and through which the request indication is received.

22. The BSC of claim 20, wherein the activity is one of a handover and an assignment.

23. The BSC of claim 20, wherein the request indication includes a circuit identifier code (CIC) of a selected TDM circuit with respect to the TDM bearer.

24. The BSC of claim 20, wherein the request indication includes a transport address of a media gateway (MGw) that will terminate an IP connection with respect to the IP bearer.

* * * * *

UNITED STATES PATENT AND TRADEMARK OFFICE
CERTIFICATE OF CORRECTION

PATENT NO. : 10,075,884 B2
APPLICATION NO. : 15/223011
DATED : September 11, 2018
INVENTOR(S) : Kampmann et al.

Page 1 of 2

It is certified that error appears in the above-identified patent and that said Letters Patent is hereby corrected as shown below:

On the Title Page

In Item (57), under "ABSTRACT", in Column 2, Line 12, delete "activity be performed" and insert -- activity to be performed --, therefor.

In Item (57), under "ABSTRACT", in Column 2, Line 15, delete "activity" and insert -- activity. --, therefor.

In the Specification

In Column 1, Line 8, delete "2010," and insert -- 2010, now Pat. No. 9,439,109, --, therefor.

In Column 2, Line 31, delete "interaction" and insert -- interaction. --, therefor.

In Column 2, Line 43, delete "path" and insert -- path. --, therefor.

In Column 6, Line 50, delete "AoIP" and insert -- AoIP. --, therefor.

In Column 6, Lines 54-55, delete "performed" and insert -- performed. --, therefor.

In Column 8, Line 48, delete "(see FIG. 6). shall" and insert -- (see FIG. 6) shall --, therefor.

In Column 8, Line 60, delete "decision" and insert -- decision. --, therefor.

In Column 8, Line 63, delete "interface" and insert -- interface. --, therefor.

In Column 9, Line 1, delete "required" and insert -- required. --, therefor.

In Column 9, Line 8, delete "AoTDM)" and insert -- AoTDM). --, therefor.

Signed and Sealed this
Twenty-ninth Day of January, 2019

Andrei Iancu
*Director of the United States Patent and Trademark Office*

CERTIFICATE OF CORRECTION (continued)
U.S. Pat. No. 10,075,884 B2

In the Claims

In Column 9, Line 45, in Claim 1, delete "activity be performed" and insert -- activity to be performed --, therefor.

In Column 10, Line 25, in Claim 9, delete "activity be performed" and insert -- activity to be performed --, therefor.

In Column 10, Line 67, in Claim 16, delete "activity be performed" and insert -- activity to be performed --, therefor.

In Column 11, Line 28, in Claim 20, delete "activity be performed" and insert -- activity to be performed --, therefor.